United States Patent
Khokar et al.

(10) Patent No.: US 12,508,779 B2
(45) Date of Patent: Dec. 30, 2025

(54) ULTRA-THIN PRE-PREG SHEETS AND COMPOSITE MATERIALS THEREOF

(71) Applicant: TAPE WEAVING SWEDEN AB, Borås (SE)

(72) Inventors: Nandan Khokar, Gothenburg (SE); David Carlstedt, Gothenburg (SE); Soraia Pimenta, London (GB); Leif Asp, Mölndal (SE); James M. Glaser, Spring Grove, IL (US); Guillaume Moreau, Borås (SE); Florence Rinn, Borås (SE); Fredrik Ohlsson, Rävlanda (SE)

(73) Assignee: TAPE WEAVING SWEDEN AB, Borås (SE)

( * ) Notice: Subject to any disclaimer, the term of this patent is extended or adjusted under 35 U.S.C. 154(b) by 67 days.

(21) Appl. No.: 16/973,584

(22) PCT Filed: Jun. 20, 2019

(86) PCT No.: PCT/EP2019/066328
§ 371 (c)(1),
(2) Date: Dec. 9, 2020

(87) PCT Pub. No.: WO2019/243488
PCT Pub. Date: Dec. 26, 2019

(65) Prior Publication Data
US 2021/0245449 A1    Aug. 12, 2021

(30) Foreign Application Priority Data

Jun. 21, 2018    (EP) .................. 18178979

(51) Int. Cl.
*B29C 70/20*    (2006.01)
*B32B 5/26*    (2006.01)
*C08J 5/24*    (2006.01)

(52) U.S. Cl.
CPC ............... *B29C 70/20* (2013.01); *B32B 5/26* (2013.01); *C08J 5/243* (2021.05);
(Continued)

(58) Field of Classification Search
CPC ..... B29C 70/20; B32B 5/26; B32B 2262/106; B32B 2307/718; B32B 2307/732;
(Continued)

(56) References Cited

U.S. PATENT DOCUMENTS 3,358,436 A    12/1967    Gentaro
3,431,602 A    3/1969    Appel
(Continued)

FOREIGN PATENT DOCUMENTS

DE    19650608 A1    6/1998
EP    1652978 A1    5/2006
(Continued)

OTHER PUBLICATIONS

European International Search Report and Written Opinion for International Application No. PCT/EP2019/066328, dated Sep. 30, 2019, 12 pages.
(Continued)

*Primary Examiner* — Brian Handville
(74) *Attorney, Agent, or Firm* — Westman, Champlin & Koehler, P..A.

(57) ABSTRACT

Novel ultra-thin unidirectional pre-preg tapes are disclosed. They can be used to produce ultra-thin woven, bias, multi-axial, chopped-oriented etc. types of pre-pregs. These ultra-thin pre-pregs enable production of composite material products with well-controlled dimensional tolerances and smooth/even surfaces. Further, they render the production of composite material products relatively simpler, tidier,
(Continued)

quicker, and economical. The obtained composite material products are relatively thinner, lighter, and mechanically higher-performing.

18 Claims, 7 Drawing Sheets

(52) U.S. Cl.
CPC ... *B32B 2262/106* (2013.01); *B32B 2307/718* (2013.01); *B32B 2307/732* (2013.01); *C08J 2323/06* (2013.01); *C08J 2323/12* (2013.01); *C08J 2353/02* (2013.01); *C08J 2361/16* (2013.01); *C08J 2369/00* (2013.01); *C08J 2377/06* (2013.01); *C08J 2381/04* (2013.01)

(58) Field of Classification Search
CPC ...... C08J 5/24; C08J 2323/06; C08J 2323/12; C08J 2353/02; C08J 2361/16; C08J 2369/00; C08J 2377/06; C08J 2381/04; C08J 2300/22; C08J 2300/24; C08J 5/042
See application file for complete search history.

(56) References Cited

U.S. PATENT DOCUMENTS

| | | | |
|---|---|---|---|
| 3,657,871 A | 4/1972 | Uchiyama et al. | |
| 3,698,039 A | 10/1972 | Kalwaites | |
| 3,713,590 A | 1/1973 | Dorschner et al. | |
| 3,798,095 A | 3/1974 | Hall | |
| 3,873,389 A | 3/1975 | Daniels | |
| 3,961,396 A | 6/1976 | Lubitzsch | |
| 4,301,579 A | 11/1981 | Van den Hoven | |
| 4,421,584 A | 12/1983 | Kitagawa et al. | |
| 4,959,895 A | 10/1990 | Sager | |
| 4,989,799 A | 2/1991 | Nakai et al. | |
| 4,990,285 A * | 2/1991 | Lahijani | D01F 9/145 264/29.7 |
| 5,042,122 A | 8/1991 | Iyer et al. | |
| 5,101,542 A | 4/1992 | Nakagawa et al. | |
| 6,032,342 A | 3/2000 | Kawabe et al. | |
| 6,049,956 A | 4/2000 | Lifke et al. | |
| 7,536,761 B2 | 5/2009 | Nestler et al. | |
| 7,571,524 B2 | 8/2009 | Kawabe et al. | |
| 8,129,294 B2 | 3/2012 | Khokar | |
| 9,074,064 B2 | 7/2015 | Ozeki et al. | |
| 9,895,867 B2 | 2/2018 | Kawabe et al. | |
| 2007/0066171 A1 | 3/2007 | Bystricky et al. | |
| 2012/0003891 A1 | 1/2012 | Schmidt et al. | |
| 2013/0101787 A1 | 4/2013 | Bhatnagar et al. | |
| 2013/0274413 A1 | 10/2013 | Ozeki et al. | |
| 2014/0004296 A1 * | 1/2014 | Khokar | D03D 13/002 428/196 |
| 2014/0065911 A1 | 3/2014 | Schmidt et al. | |
| 2014/0377556 A1 | 12/2014 | Boursier | |
| 2016/0039185 A1 | 2/2016 | Kawabe et al. | |
| 2017/0297295 A1 | 10/2017 | Bhatnagar et al. | |
| 2018/0100043 A1 | 4/2018 | Takashima et al. | |
| 2019/0358858 A1 * | 11/2019 | Nutt | B29C 70/50 |

FOREIGN PATENT DOCUMENTS

| | | |
|---|---|---|
| EP | 2479327 A1 | 7/2012 |
| EP | 2669081 A1 | 12/2013 |
| EP | 2671991 A1 | 12/2013 |
| EP | 2 716 693 | 4/2014 |
| EP | 2716693 A1 | 4/2014 |
| EP | 2796604 A1 | 10/2014 |
| EP | 3013546 B1 | 7/2017 |
| EP | 3275921 A1 | 1/2018 |
| GB | 694789 A | 7/1953 |
| GB | 841098 A | 7/1960 |
| GB | 1112578 A | 5/1968 |
| GB | 1312455 A | 4/1973 |
| GB | 1395925 A | 5/1975 |
| GB | 1476929 A | 6/1977 |
| JP | 2-36236 | 2/1990 |
| JP | H2145830 A | 6/1990 |
| JP | H04-096331 | 8/1992 |
| JP | H09-327536 | 12/1997 |
| JP | H11-254562 | 9/1999 |
| JP | 3382603 | 12/2002 |
| JP | 2005-232224 | 9/2005 |
| JP | 2012-521450 | 9/2012 |
| JP | 2014-208457 | 11/2014 |
| JP | 2018-62638 | 4/2018 |
| WO | 2006037083 A2 | 4/2006 |
| WO | 2006037083 A3 | 12/2006 |
| WO | WO 2012/081407 | 6/2012 |

OTHER PUBLICATIONS

Ryo Umeki et al., "A new unidirectional carbon fiber prepreg using physically modified epoxy matrix with cellulose nano fibers and spread tows", Composites Part A: Applied Science And Manufacturing, vol. 90, pp. 400-409, XP055532330, dated Nov. 1, 2016, 10 pages.

"A New Unidirectional Carbon Fiber Prepreg Using Physically Modified Epoxy Matrix with Cellulose Nano Fibers and Spread Tows", by R. Umeki et al., Composites: Part A 90 (2016), pp. 400-409.

"Effect of Lamina Thickness on First Ply Failure in Multidirectionally Laminated Composites", by H. Sasayama et al., dated Jul. 31, 2003, 7 pgs.

Office Action from Japanese Patent Application No. 2020-569996, dated Mar. 24, 2023.

Office Action from Chinese Patent Application No. CN 201980038386. 6. dated May 28, 2023 (including a computer translation in English).

* cited by examiner

ULTRA-THIN PRE-PREG SHEETS AND COMPOSITE MATERIALS THEREOF

CROSS-REFERENCE TO RELATED APPLICATION

This Application is a Section 371 National Stage Application of International Application No. PCT/EP2019/066328, filed Jun. 20, 2019 and published as WO/2019/243488 on Dec. 26, 2019, in English, the contents of which are hereby incorporated by reference in their entirety.

FIELD OF INVENTION

The present invention in general relates to fibre/fabric reinforcements pre-impregnated with a matrix material, called pre-preg, and their composite materials. In particular, the present invention concerns novel ultra-thin pre-preg sheets composed of tapes for manufacturing complex geometry composite material products with relatively greater advantages and convenience.

BACKGROUND

Pre-pregs have been used extensively for decades in the manufacture of composite materials. As use of composite materials grows in many areas, there is also the accompanying need for manufacturing products having complex geometries and economically. The available textile reinforcements of various types are relatively thick, and sometimes much longer than necessary, presenting draping difficulties when wanting to create composite material parts with complex geometries. This problem needs to be overcome to allow greater use of composite materials, especially in the means for transportation to reduce $CO_2$ emissions and increase energy utilisation. The use of composite materials in the transportation application also entails that they increase safety, be producible in large volumes relatively quickly or in short cycle times, accord convenience of manufacture, and have low production costs.

Therefore, to enable production of complex-geometry composite material parts and their economical manufacture, use of thin textile reinforcements is necessary. Together with use of most suitable length of reinforcements for a given application and situation, thin reinforcements, enable achieving best draping, for example into tight corners, over very small radius bends/edges, onto simultaneous multiple curvatures etc. However, use of such thin textile reinforcements is cumbersome, tedious and costly. Also, traditional dry 'thin' textile reinforcement sheets, be they of unidirectional, woven, multiaxial etc. types comprising continuous fibres, or even organo type comprising cut/chopped fibres in random orientations, are relatively thick, typically about 0.15 to 0.2 mm. Such chopped fibres also tend to be longer than necessary at times, for example longer than 20 mm. A pre-preg sheet comprising a number of such so-called 'thin' reinforcements and the matrix material tend to be even thicker, typically about 0.25 to 0.3 mm. Such available 'thin' pre-preg sheets also have the tendency to split laterally due to cracking of resin or matrix material when forced into complex geometries, creating gaps and lowering of material performance and reliability.

To produce improved in-plane isotropic properties and reduce splitting, 'thin' unidirectional continuous fibre tows are commonly plied in mutually different multiaxial orientations, usually four (0°, 90°, ±45°) in the pre-preg sheets. The combined thickness of such a stacked arrangement of four reinforcements in the pre-preg sheet happens to be at least 0.6 to 1 mm. Plying more number of such sheets renders the stack correspondingly thicker. It thus follows that at present there is a limitation to production of a planar isotropic composite material comprising four reinforcements totalling a thickness of less than 0.5 mm, for example 0.08 to 0.16 mm, which is at least 80% thinner than that available presently. Further, the relatively higher content of resin in available 'thin' pre-preg sheets lowers the fibre volume-fraction and increases their areal weight. This limitation also applies to organo type pre-preg wherein the used chopped/cut pieces of either fibrous tows or fabrics in four layers results in a thickness of at least 0.5 to 1 mm. Use of ultra-thin reinforcements is necessary for enabling production of thin in-plane isotropic composite materials.

Because the plied continuous fibres (as in unidirectional, woven, bias, multiaxial fabrics etc.) and chopped/cut pieces (as in either orderly or random orientation arrangements) occur overlapping in mutually different orientations at one or more places, they tend to generate some crimp in the resulting pre-preg. The crimp angle created by the fibrous tows can vary from large to small depending on the relative thickness and/or number of pieces of fibrous tows that occur stacked over/under another fibrous tow in the pre-preg. The smallest crimp angle happens when one fibrous tow overlaps one other fibrous tow, which is typically about 4° to 8°, for a given distance of angle formation between them. A single chopped fibre tow could sometimes display even more than one crimp angle if it happens to lie over/under more than one fibre tows. For realising higher material properties, it is important that the crimp angle is as low as possible, for example below 3° through use of ultra-thin reinforcements. A low crimp angle is of advantage for realising high in-plane stiffness. Low crimp angle reduces the out-of-plane misalignment angles between the overlapping fibres and enable achieving closer to the highest possible stiffness of the perfectly straight fibres, for example in a composite material laminate.

Another important aspect that has not been considered so far is that of increasing the mechanical properties of thin composites by use of stiff carbon fibres, especially the ultra high modulus carbon fibres (UHMCFs), such as the pitch type carbon fibres. The UHMCFs have not been used because they are brittle and break when subjected to lateral forces. The available so-called 'thin' pre-pregs of UHMCFs are produced using relatively thick tows whereby their extreme performance remains mostly unutilised in the thin composites. Such 'thin' pre-pregs do not, and cannot, comprise spread fibres of UHMCF.

Further, yet another aspect that has been overlooked so far is the occurrence of excessive resin or matrix material in the available 'thin' pre-pregs due to the employed methods which apply the resin fully covering and over-saturating the fibrous sheet. The resin is not applied in an amount that is just-sufficient to wet out the fibres. Also, the resin is not applied in a manner that it occurs distributed in a suitable pattern to facilitate its quick spreading and mutual coalescing/merging upon application of heat and pressure to wet-out the fibres. Accordingly, a pre-preg comprising just-sufficient amount of resin by way of being arranged in some areas in a suitable pattern that enables its subsequent quick spread to wet-out the fibres, and dry fibres in other areas, is unknown yet.

Further, the relatively thick pre-pregs have unnecessarily relatively excessive resin occurring between the fibres of the adjacent plied pre-preg sheets. The excessive resin increases the distance between the constituent fibres of the plies. This increased distance in turn (a) generates high out-of-plane shear stresses in the plied sheets leading to cracking of the matrix (delamination) between the plies, which lowers the composite material's performance and reliability, and (b) causes buckling/kinking and fracturing of fibres, especially of inner plies, particularly in a tight bend, during press-forming process as the plied fibres occur in mutually different orientations and planes, which once again leads to lowering of properties. The kinking and fracturing of fibres, specially the brittle types like UHMCFs, needs to be prevented or minimised for higher realisation of their properties, and thereby increased performance of the composite materials. Therefore, the distance between the fibres of the plied pre-preg sheets ought to be as little as possible. For enabling mutual sliding of plied fibres, only a very thin layer/film of resin, functioning as slip-planes, is required.

Use of pre-preg sheets comprising pieces of chopped/cut tows or pre-pregs arranged in random orientations, e.g. as described in EP 2796604, EP 2671991, EP 2669081, EP 3013546, EP 2716693 etc., a route considered for creating complex geometry parts, also naturally have all the deficiencies described above.

There is therefore a need for an improved pre-preg sheet, addressing at least some of the above-discussed drawbacks of the prior art.

SUMMARY OF THE INVENTION

The object of the present invention is to provide a new pre-preg sheet, as well as a multi-ply arrangement comprising such pre-preg sheets, alleviating at least some of the above-discussed problems related to previously known solutions.

This object is achieved by a pre-preg sheet and a multi-ply arrangement as defined in the appended claims.

According to a first aspect of the invention, there is provided a pre-preg sheet comprising a fibre reinforcement and either a thermoset of thermoplastic matrix material, wherein the fibre reinforcement comprises unidirectional spread fibres and the pre-preg sheet has a thickness of less than 100 micrometers.

In one embodiment, the thickness is in the range of 10-70 micrometers and preferably in the range of 15-50 micrometers, and most preferably in the range of 20-40 micrometers.

In one embodiment, the pre-preg sheet is in the form of a tape, having a length exceeding 5 mm and a width exceeding 2 mm.

In one embodiment, the crimp angle of its fibres is less than 3 degrees, and preferably less than 2 degrees.

In one embodiment, a volume-fraction of fibres within the pre-preg sheet is 40% or more, and preferably 50% or more, and most preferably 60% or more.

In one embodiment, a volume-fraction of fibres within the pre-preg sheet is equal to or less than 90%.

In one embodiment, the weight of the matrix material is within the range of 5-50% of the total weight of the pre-preg sheet, and preferably within the range 20-50%, and most preferably within the range 20-40%.

In one embodiment, the pre-preg sheet has a fibre areal weight in the range 5-100 g/m2, and preferably 10-80 g/m$^2$, and most preferably 15-50 g/m2.

In one embodiment, the fibres comprises carbon fibres, and preferably ultra high modulus carbon fibres (UHMCF).

In one embodiment, the thermoset matrix material is in solid-state below a first temperature, and soft and tacky above said temperature, and wherein the matrix material is irreversibly cured when heated above a second temperature for a certain duration of time, wherein the first temperature is 20 degrees C. or more, and wherein the second temperature is higher than said first temperature.

In one embodiment, the matrix material is provided in the form of continuous or discontinuous lines, extending at least partly in a direction different from the direction of the fibres.

In one embodiment, the matrix material is provided in the form of disconnected dots or speckles.

In one embodiment, the thermoset or thermoplastic matrix material is provided in the form of layer, attached to at least one surface of the fibre reinforcement, said layer being provided with pores or openings for exposing fibres of the reinforcement through said layer.

According to another aspect of the invention, there is provided a multi-ply arrangement comprising at least two pre-preg sheets of the type discussed above, wherein the pre-preg sheets are arranged at least partly overlapping each other, and wherein the overlapping pre-preg sheets have their fibres oriented in mutually different directions.

In one embodiment, at least some of the pre-preg sheets are tapes extending over the entire width and/or length of the multi-ply arrangement.

In one embodiment, at least some of the pre-preg sheets are short tapes, preferably having a length of 5-80 mm and a width of 2-30 mm, and most preferably a length of 20-50 mm and a width of 5-20 mm.

According to still another aspect of the invention, there is provided a use of a pre-preg sheet as discussed above for the manufacture of a composite material.

It is noted that the present invention overcomes the drawbacks related to previously known solutions, as discussed above, at least partly by the provision of a pre-preg sheet, preferably in the form of tape, with the following collective features:

(i) It is thinner than pre-pregs available presently by way of being composed of spread fibres;
(ii) Its thin spread fibres preferably create a crimp angle smaller than that possible presently;
(iii) It is preferably composed of stiff carbon fibres, preferably UHMCFs, for extreme performance;
(iv) It preferably has just-sufficient amount of resin, which is arranged in a suitable pattern to facilitate its quick spread/dispersion to wet out the fibres when heat and pressure are applied; and
(v) It preferably creates a very short distance between the fibres of the overlapping plies of pre-preg sheets to facilitate their mutual sliding by a thin layer of resin present therein, e.g. during draping.

Accordingly, this invention provides novel pre-preg sheets, comprising preferably either continuous fibrous tapes or chopped parts of tapes. Such tapes have their length greater than the width and the width significantly greater than the thickness of the tape specified here. The term "tape" here neither excludes nor necessarily limits to mean the generally perceived significantly long and relatively narrow-and-thin sheet construct of fibrous assembly. This is because the "narrow" aspect, which refers to the width, can be in the range from a few millimetres to over 1 m, for example from 1 mm to 2000 mm. All these ultra-thin pre-preg tapes/sheets of any width contain unidirectional fibres, i.e. most of the fibres occur substantially orientated in the longitudinal direction of the tape/sheet. Small variations/deviations in the orientation of the fibres is inherent due to their flexible nature as also other aspects like intermingling, twists, crimps etc. Such naturally occurring changes in the fibres' linearity is included here within the scope of unidirectional fibres.

Importantly and uniquely, the thickness of such a single pre-preg tape is defined to be in the range 20 to 40 micrometre (i.e. 0.02 to 0.04 mm) and henceforth called ultra-thin pre-preg tape. Such ultra-thin pre-preg tapes comprise unidirectionally oriented fibres, preferably spread carbon fibres, especially of the UHMCF type, and a suitable resin which is just-sufficient in amount as specified below. These ultra-thin pre-preg tapes can be used for producing woven, bias, multiaxial etc. reinforcement materials. These customised tapes can be also chopped/cut, in either same or different shapes, and used for producing organo type reinforcements of both the randomly and orderly arranged types.

Accordingly, the ultra-thin pre-preg tapes can be used in either continuous-length form or discontinuous-length form. By a continuous-length ultra-thin pre-preg tape is implied a straight tape that runs as a single unit from one edge to another edge, which could be e.g. the opposite or adjacent edges of the sheet that results from their suitable arrangements, such as woven, bias, multiaxial etc. By a discontinuous-length of ultra-thin pre-preg tape is implied a straight tape that does not run as a single unit between the edges of the sheet that results from their random scattering and orientation arrangements, such as organo sheets. The arrangements of continuous-length and discontinuous-length ultra-thin pre-preg tapes are convertible into a composite material by applying the required heat and pressure.

The novel ultra-thin pre-preg tapes ensure high draping ability because their thinness, and suitable lengths, allow bending and configuring into tight corners, over very small radius edges and sharp bends, onto simultaneous multiple curvatures etc. In woven, bias, multiaxial etc. reinforcement material products, the constituent ultra-thin pre-preg tapes occur stacked in mutually different orientations and overlap. The ultra-thin pre-preg tapes in the form of cut/chopped pieces, in either regular or irregular shapes, are used for producing organo pre-preg sheets. The cut-pieces occur either randomly or orderly oriented and partly overlapping with each other on the sheet's surfaces. Such regular- and irregular-shaped cut/chopped pieces of ultra-thin pre-preg tapes preferably have overall dimensions in the range 5 to 80 mm long and 2 to 30 mm wide, most preferably a length of 20 to 50 mm and a width of 5 to 20 mm, and thickness of 20 to 40 micrometres for achieving the desired performance and shape-forming capability.

Uniquely, the crimp angle created by the chopped/cut pre-pregs in the resulting organo type pre-preg is significantly reduced. In comparison to the crimp angle obtaining in the available organo pre-pregs comprising tows, the organo pre-preg comprising ultra-thin chopped/cut pre-preg tapes displays a very small, practically almost negligible, crimp angle, typically less than 3°. An important advantage of such low crimp angle, arising from the ultra-thinness of the pre-preg tapes, is the significantly reduced generation of shear stresses in the fibre composite, which correspondingly improves the composite materials' performance and reliability. Another benefit of the small crimp angle is the occurrence of just-sufficient resin between the overlapping chopped ultra-thin pre-pregs.

The ultra-thin pre-preg tape comprises just-sufficient amount of resin, meaning that the amount of resin applied to an individual tape results in the ultra-thin pre-preg tape having a thickness in the range 0.02 to 0.04 mm (20-40 micrometres) while the fibre volume-fraction in an individual pre-preg tape is at least 40%. The fibre volume fraction of a compacted stack of ultra-thin pre-preg tapes does not exceed 90%. The resin or matrix material used to produce the ultra-thin pre-preg tape can be either thermoset or thermoplastic types. Advantageously, the use of just-sufficient resin promotes relatively less harm to the environment.

The just-sufficient amount of resin or matrix material is realised by applying a calculated amount of resin in a preferred pattern in relation to the areal weight and/or volume of the fibre reinforcement under consideration, which aids the resin's quicker spread/dispersion and coalescing/merging upon application of heat and pressure. The pattern of applied resin involves considering the resin's viscosity and composition. The resin is so spaced out in the pattern that its distribution on the ultra-thin spread fibres ensures shortest paths for its spread and coalescence to quickly wet out the fibres upon applying heat and pressure. Advantageously, excessive amount of resin is not needed because the ultra-thin pre-preg tapes have most of its fibres occurring exposed at the surfaces and the resin does not have to flow deeply into the fibre mass to wet them. The amount of resin occurring in the ultra-thin pre-preg tape is preferably in the range 20-50% by weight of the fibres constituting the ultra-thin pre-preg tape. The fibre areal weight in the ultra-thin pre-preg tape is preferably in the range 10 to 80 g/m$^2$. Ultra-thin pre-pregs have not been known so far.

The resin or matrix material can be either thermoset or thermoplastic types depending on the intended end-use of the composite material. The thermoset formulation used is preferably of a composition that a person skilled in chemistry can produce using one of the commonly available thermoset base-resin systems (such as epoxy, Benzoxazines, Bismaleimides (BMI), polyimides etc.) and combining it in suitable proportions of weight with a curing/hardening agent (for example primary amines (e.g. aromatic, cycloaliphatic, aliphatic types), secondary amines, tertiary amines, polyamide resin, imidazoles, anhydrides, polymercaptan, peroxides, latent curing agents etc.) including water borne type curing/hardening agents, and other optional ingredients (such as catalysts, accelerators, flame retardants, fillers, toughening agents etc.) whereby the resulting formulation is tailored for obtaining a range of different viscosities from 50 cP to 1 000 000 cP and a range of different curing/hardening temperature from 50° C. to 250° C., and a range of different curing/hardening time from 1 millisecond to two weeks.

The obtained novel ultra-thin pre-preg uniquely displays the ability to be repeatedly softened up in the temperature range 20° C. to 200° C. Depending on the formulation used, the curing/hardening temperature of resin formulation occurs typically in the range 50° C. to 180° C., or up to 250° C. when base-resin system BMI is used. When resin's curing/hardening temperature is exceeded over the said range, the viscous curing/hardening agents liquefy and trigger the chemical reaction or polymerization. The formulation then sets and cures/hardens permanently after a required duration of heating, encapsulating the thin-ply reinforcement. The time required for curing/hardening depends on the composition of the employed formulation of base resin systems, curing/hardening agents and other ingredients used, besides the geometry (e.g. relative thickness-thinness) of the parts being produced.

When wanting to use thermoplastic resins, it is preferably chosen from the following selection depending on the end-use requirements, for example for aero application PEEK, PEKK, PPS; automotive application PA, PA6, PA6.6, PA12; Sports application PC, ABS, PP, PE etc.

Depending on the formulation of the thermoset or thermoplastic resin used, it can be made tacky when required by heating. The obtained ultra-thin pre-preg thus displays resin impregnated fibres in some parts and dry fibres with countless fine micro-pores/openings/interstices between them in other parts.

The ultra-thin pre-preg can be softened, wholly or partly at any desired area/region, whenever required (e.g. for draping to form shape) and hardened/cured or solidified by exceeding the temperature threshold of the formulation for a required duration as mentioned in the foregoing.

When the ultra-thin pre-preg is subjected to required temperature, time, and pressure, for example when in a mould, the viscosity of the fixed amount of patterned resin gets lowered, liquefies, and spreads and coalesces at once in all places in a controlled volume and manner (e.g. in the mould) and encapsulates the fibres upon curing/solidification. Because the resin does not have to penetrate deeply into the reinforcement as most of the fibres of the thin-ply reinforcements occur exposed at the surfaces, the liquefied resin uniformly and quickly engulfs and embeds the fibres of the thin reinforcement in all places. With induction heating method, liquefaction of resin and thereby impregnation of ultra-thin pre-preg is more speedily achieved compared to other methods of heating up. Hence, conversion of ultra-thin pre-preg into composite material is advantageously less time- and energy-demanding. Advantageously, when the resin begins liquefying and spreading, the air in thin-ply resin-patterned reinforcement fibres/fabrics escapes easily and quickly through the countless fine micro-pores/interstices/openings etc. Entrapment of air bubbles is virtually eliminated resulting in void-free composite material products. As can be imagined now, conversion of ultra-thin pre-preg into a composite material product is rather tidy, economical, and convenient.

The thickness of the resin or matrix material between the fibres of two mutually overlapping or plied/stacked ultra-thin pre-preg tapes is preferably in the range 2 to 4 micrometre (i.e. 0.002 to 0.004 mm). Thus, an ultra-thin layer/film of resin or matrix material occurs between the fibres of the two tapes. Such an ultra-thin resin therebetween is sufficient to function as slip-planes to enable mutual sliding of the fibres in the plied tapes, for example during press-forming process.

Some advantages with the use of the novel ultra-thin pre-preg sheets may be exemplified now to indicate the rational of this invention. An arrangement of eight sheets of ultra-thin pre-preg tapes stacked in the usual four orientations in two repeating sequences for obtaining a balanced lay-up for in-plane isotropic structure, is in the range 0.16 to 0.32 mm. The thickness of the typical 'thin' multi-axial pre-pregs of same eight-ply construction is about 1 to 2 mm. In comparison, the multiaxial material comprising ultra-thin pre-preg of this invention is, on average, at least 80% thinner than the typical 'thin' multiaxial material available presently. There is also the corresponding reduction in the crimp angle and thereby increased in-plane stiffness. Further, because the properties of UHMCFs are much greater than those of the non-UHMCFs (i.e. usual carbon fibres), their plies of similar thickness and fibre orientation will display correspondingly increased properties. It thus follows that using a required number of plies of ultra-thin pre-preg sheets comprising UHMCFs, relatively thinner composite materials displaying extremely high properties can be obtained. For example, a composite material laminate with an in-plane stiffness of at least 150 GPa, and an in-plane tensile strength in excess of 700 MPa. Further, because the ultra-thin pre-preg sheets are thinner than the typical 'thin' sheets, and thus have a relatively short distance between the plied fibres, they lend themselves to be also easily draped into tight corners, sharp bends, multiple curvatures etc. Further, because the ultra-thin pre-preg sheets comprise just-sufficient resin arranged in a pattern that enables its quick spreading/dispersion and coalescing, the novel ultra-thin pre-preg sheets can be relatively quickly converted into composite material products of complex geometries. The ultra-thin pre-pregs of this invention thus uniquely enable economical production.

Further, when ultra-thin pre-preg tapes are cross-plied in two or more directions for imparting corresponding multi-direction load-bearing capability, there is an increased resistance to mutual lateral displacement of fibres of the cross-ply, through what is called the 'Thin-Ply Effect', which is briefly described as follows. As majority of the fibres of the ultra-thin pre-preg tapes occur exposed at the surfaces, the just-sufficient resin or matrix material binds/adheres these fibres highly closely to each other in the cross-ply fibre arrangement. This way the distance between the fibres of two mutually overlapped or plied/stacked ultra-thin pre-preg tapes is extremely reduced to a range of 2 to 4 micrometre (i.e. 0.002-0.004 mm). The highly reduced distance between the cross-plied fibres helps in greatly resisting splitting of the resin and thereby suppression of development of micro-cracks, which in turn increases the resulting composite materials' reliability/durability.

The novel ultra-thin pre-preg tapes can be used to produce woven, bias, multiaxial etc. materials. It can be also chopped into pieces and used for creating a randomly oriented fibrous mat, called the organo sheet, for manufacturing suitable types of composite material products.

The above description should not lead to the assumption that the novel ultra-thin pre-preg tapes (a) comprise only UHMCFs; they could also comprise either non-UHMCFs, or a blend of both UHMCFs and non-UHMCFs, and (b) are unsuitable for use in making composite material products by the conventional processes. It is an advantageous aspect of the novel ultra-thin pre-preg tapes that if required they can be also made into partial pre-pregs, i.e. comprising one or more components of the resin or matrix material, and suitably processed by the conventional methods such as resin transfer moulding, vacuum assisted resin transfer moulding, resin film infusion, press-forming, pultrusion, filament winding etc., wherein the remainder resin component/s are included to achieve polymer curing (with thermoset resin) or solidification (with thermoplastic resin).

It may be indicated here that the ultra-thin pre-preg tapes and their woven, bias, multiaxial etc. products, even composites, are highly suitable for use in strengthening concrete structures such as heritage and other buildings, bridges, columns etc. on site. It can be applied in as many layers as required and bonded to the prepared surfaces by application of necessary heat and pressure, or by using a suitable adhesive. The relative lightness and extreme performance of ultra-thin pre-preg tapes, coming from use of UHMCFs, are particularly advantageous for use on old heritage buildings because it imparts relatively high strength to the weak structures without unduly over-burdening the structure, and for being relatively lighter and easier to handle and use at site.

The ultra-thin pre-preg tape with the indicated collective features according to the present invention, and the resulting composite materials thereof, are not known yet. Accordingly, the novel ultra-thin pre-preg tape, and the composite material thereof are further clarified referring to the embodiments described below.

BRIEF DESCRIPTION OF DRAWINGS

For exemplification purpose, the inventions will be described in closer detail in the following with reference to embodiments thereof illustrated in the attached drawings, wherein.

DETAILED DESCRIPTION OF THE PREFERRED EMBODIMENTS

Figure 1:
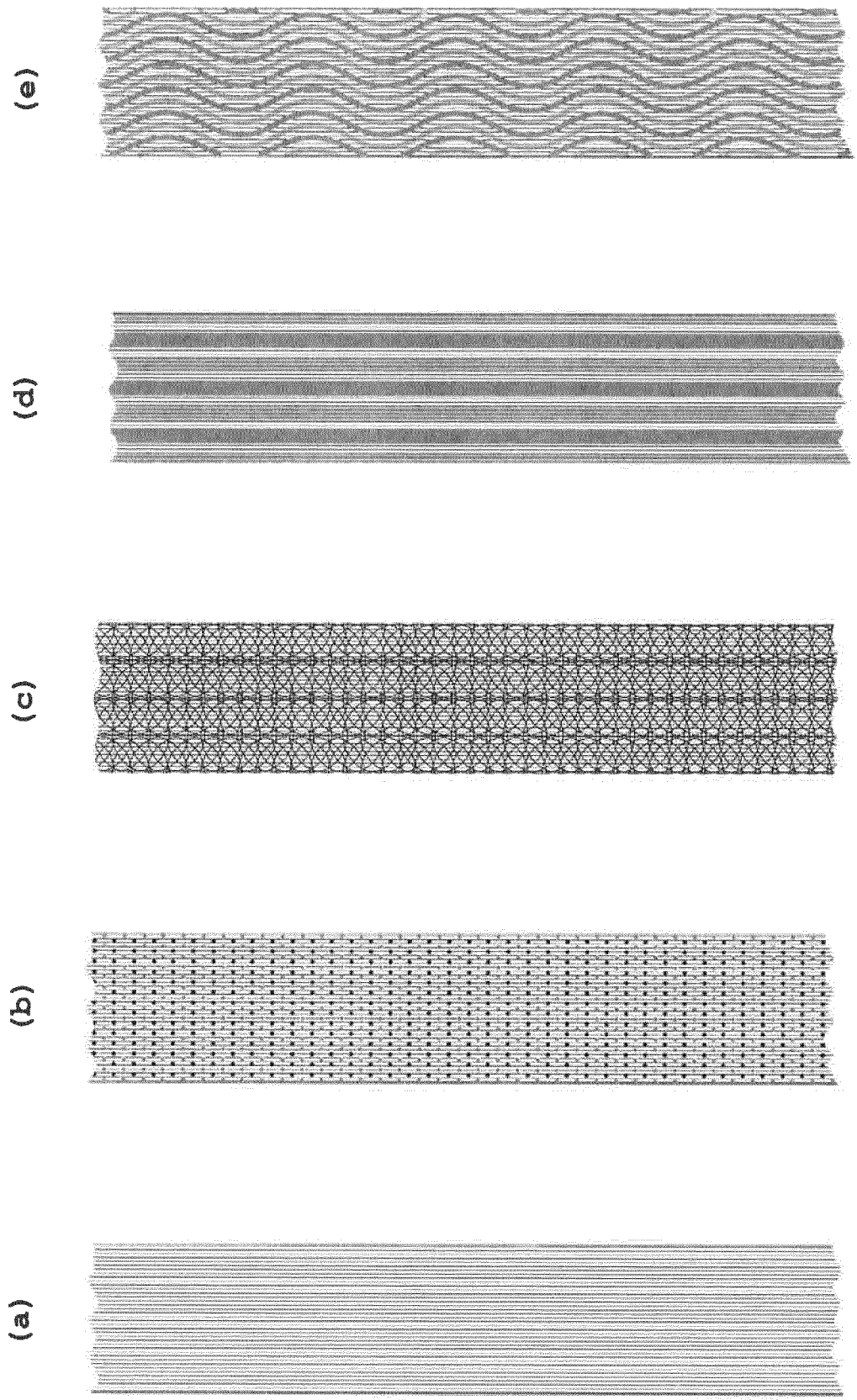
FIG. 1 exemplifies ultra-thin pre-preg sheets in the form of uni-directional spread fibre tapes bearing just-sufficient amount of resin in differently distributed patterns.

In the following detailed description, preferred embodiments of the present invention will be disclosed. However, it is to be understood that features of the different embodiments are exchangeable between the embodiments and may be combined in different ways, unless anything else is specifically indicated. It may be also noted that, for the sake of clarity, the dimensions of certain components illustrated in the drawings may differ from the corresponding dimensions in real-life implementations of the invention. Even though in the following description numerous specific details are set forth to provide with a more thorough understanding of the present invention, it will be apparent to one skilled in the art that the present invention may be practiced without these specific details. In other instances, well known constructions or functions are not described in detail to not obscure the present invention.

The novel ultra-thin pre-preg tapes of this invention are produced by first spreading the carbon fibre tows, employing a modified method based on one or more suitable known methods, for example pressure contact (GB 841098, GB 1395925, GB 1476929, U.S. Pat. Nos. 4,989,799, 5,101,542, EP 1652978, U.S. Pat. No. 7,536,761), vibratory (U.S. Pat. Nos. 3,798,095, 4,959,895, JP 2036236, U.S. Pat. No. 5,042, 122), lateral expansion (GB 694789, GB 1112578, U.S. Pat. Nos. 3,961,396, 4,301,579, JP 2145830, U.S. Pat. No. 6,049, 956), fluid (U.S. Pat. Nos. 3,431,602, 3,698,039, GB 1312455, U.S. Pat. Nos. 3,713,590, 3,873,389, 4,421,584, 6,032,342, JP 3382603, U.S. Pat. No. 7,571,524), electrical discharge (U.S. Pat. Nos. 3,358,436, 3,657,871, DE 19650608) etc.

The obtained ultra-thin spread tows are next subjected to a novel patterned impregnation process wherein the required resin or matrix material, whether thermoset or thermoplastic, is applied in a controlled and calculated amount in a patterned form. Advantageously such patterned ultra-thin pre-preg tapes are producible using conventional equipment and methods, for example those found in the textile printing industry. Such known methods and equipment are unnecessary to describe here. If wanting to use thermoplastic films, then either its suitably perforated type or small pieces transferable from the film can be adhered to the ultra-thin spread fibres for achieving application of the calculated amount of thermoplastic resin. In any case, whether using thermoset or thermoplastic, the resin pattern is so laid out on either one or both the surfaces of the ultra-thin spread fibres that the applied just-sufficient amount of resin's distribution arrangement ensures the shortest paths for its quick spreading and coalescing to wet-out the fibres upon applying the necessary heat and pressure. The pattern of applied resin involves factoring in the resin's viscosity and composition.

Some constructs of the novel ultra-thin pre-preg tapes/ sheets are exemplified in FIG. 1 showing highly magnified views of some different types of ultra-thin pre-preg tapes.

In FIG. 1a is indicated a dry ultra-thin tape which is a basis for obtaining the ultra-thin pre-preg tapes. It may be noted that the fibres therein are shown separated from each other to only represent or convey that they are substantially oriented in the longitudinal direction of the tape. Showing them occurring touchingly to each other will only create a solid figure which will not help illustrate the point clearly. The thickness of the individual tape is in the range specified earlier. Due to the ultra-thinness of the tape, substantial number of fibres of the tape occur exposed at the front and back surfaces of the tape. This is highly advantageous because the resin or matrix material does not have to flow deeply into the fibre mass to wet them. Hence, wetting of fibres will be uniquely achieved easily, quickly, uniformly and thoroughly.

In FIG. 1b. is shown an ultra-thin pre-preg tape with the resin applied partly, for example by fine spraying or printing, on both surfaces forming tiny dots/speckles/dabs/blobs/ beads/flecks etc. in a suitable pattern. Preferably the dots/ speckles etc. on the two surfaces occur mutually offset, but suitably closely and uniformly distributed to achieve quicker and uniform wetting of the fibres from both surface sides simultaneously when heated up under pressure. The applied dots/speckles of the resin adhere/stick to the fibres of the ultra-thin tape. Each of these dots/speckles connect a high number of fibres/filaments in the ultra-thin tape's thickness and width directions. Some of such fibres may occur commonly connected to the resin dots/speckles existing at the two surfaces of the tape as these fibres are generally extremely fine (their diameter is in micrometres). Therefore, the illustration of the ultra-thin pre-preg tape in FIG. 1b is only a coarse representation.

In FIG. 1c is shown another type of ultra-thin pre-preg tape which has the resin applied in multiple whirl/spiral/coil strand-like pattern. For processing convenience, the whirling/coiling strands of resin are preferably extending substantially along the length direction of the tape, and preferably on both the surfaces of the tape in a closely alternating and offset manner so that the whirling resin strands on the two surfaces preferably do not overlap each other. The applied whirling/coiling strands of the resin adhere/stick to the tape. Because these whirling resin strands run in curving form in a continuous manner, they connect a high number of the extremely fine fibres/filaments in the tape's thickness and width directions. Many of the fibres thus occur commonly connected, at some point or the other along their length direction, to the resin whirls/spirals existing at both the surfaces of the tape. Such strands may be also applied discontinuously. Again, FIG. 1c is only a coarse representation.

In FIG. 1d is shown yet another type of ultra-thin pre-preg tape which has the resin applied in multiple linear stripe-like pattern. For processing convenience, the linear stripe-like resin is preferably applied substantially along the length direction of the tape, and preferably on both the surfaces of the tape in a manner that the linear stripe-like resin preferably occurs on the two surfaces closely alternatingly arranged, preferably without mutually overlapping, as indicated in the figure, for uniform and quick wetting of the fibres. Alternatively, the linear stripe-like resin can be also applied in another orientation, for example, diagonally or at any angle relative to the longitudinal edge/s of the ultra-thin tape, including perpendicularly. The applied linear stripe-like resin adheres/sticks on the tape's two surfaces. Because these linear stripe-like resin run substantially straight in a continuous manner, they connect with a high number of the extremely fine fibres/filaments in the tape's thickness and width directions. When the linear stripe-like resin is applied at an angle relative to the longitudinal edge/s of the tape, some of the fibres in the tape width direction may occur commonly connected, at some point or the other, to the stripe-like resin which occurs at both the surfaces of the tape. Such stripes may be also applied discontinuously. Again, FIG. 1d is only a coarse representation.

In FIG. 1e is shown yet another type of ultra-thin pre-preg tape which has the resin applied in multiple non-linear or curvy stripe-like pattern. For processing convenience, the curvy stripe-like resin is preferably applied substantially along the length direction of the tape, and preferably on both the surfaces of the tape in a manner that the non-linear curvy stripe-like resin on the two surfaces preferably occur in a closely alternating arrangement without overlapping each other and with uniform distribution as indicated in the figure. The applied curvy stripe-like resin adheres/sticks on both the surfaces of the tape. Because these stripe-like resin runs in curving form in a continuous manner, each of them connects with a high number of the extremely fine fibres/filaments in the tape's thickness and width directions. Some of the fibres may occur commonly connected, at some point or the other, to the curvy stripe-like resin which occurs at both the surfaces of the tape. Such non-lineary stripes may be also applied discontinuously. Again, FIG. 1e is only a coarse representation.

Apart from the above disclosed different styles of resin applications, such as dots/speckles, stripe-like, strand-like etc., other types could be also considered depending on end-use and economic considerations. For example, wherein the resin does not run continually as a strand or stripe but is in a discontinuous zigzag form, or a repeating motif made of a series of dots/speckles, or it is in an individual pattern that repeats regularly and uniformly distributed, such as squares, circles, ring-like, line-like etc. forms, or gapped or perforated stripe-like form, or other parallel lines form, or combination of some of the various described types, or other different types etc. All such resin patterns may occur on either one or both the surfaces of the ultra-thin pre-preg tapes.

It may be noted that resin formulations of either same kind or different kinds may be advantageously applied on either one or both the surfaces of the ultra-thin pre-preg tapes to engineer specific properties for certain end-uses. Different types of resin formulations may be also applied for combination effect of their different properties, on either one or both the surfaces of the ultra-thin tapes.

When relatively narrow ultra-thin pre-preg tapes are produced, for example up to 100 mm wide, they could be used directly as continuous-length tape-like warps and wefts to produce bi-directional woven fabrics. Such woven fabrics may be produced in either close or open structural configurations to meet with the end-use requirements. Production of woven materials using tape-like warps and wefts is known from e.g. U.S. Pat. No. 8,129,294 (B2).

Figure 2A:
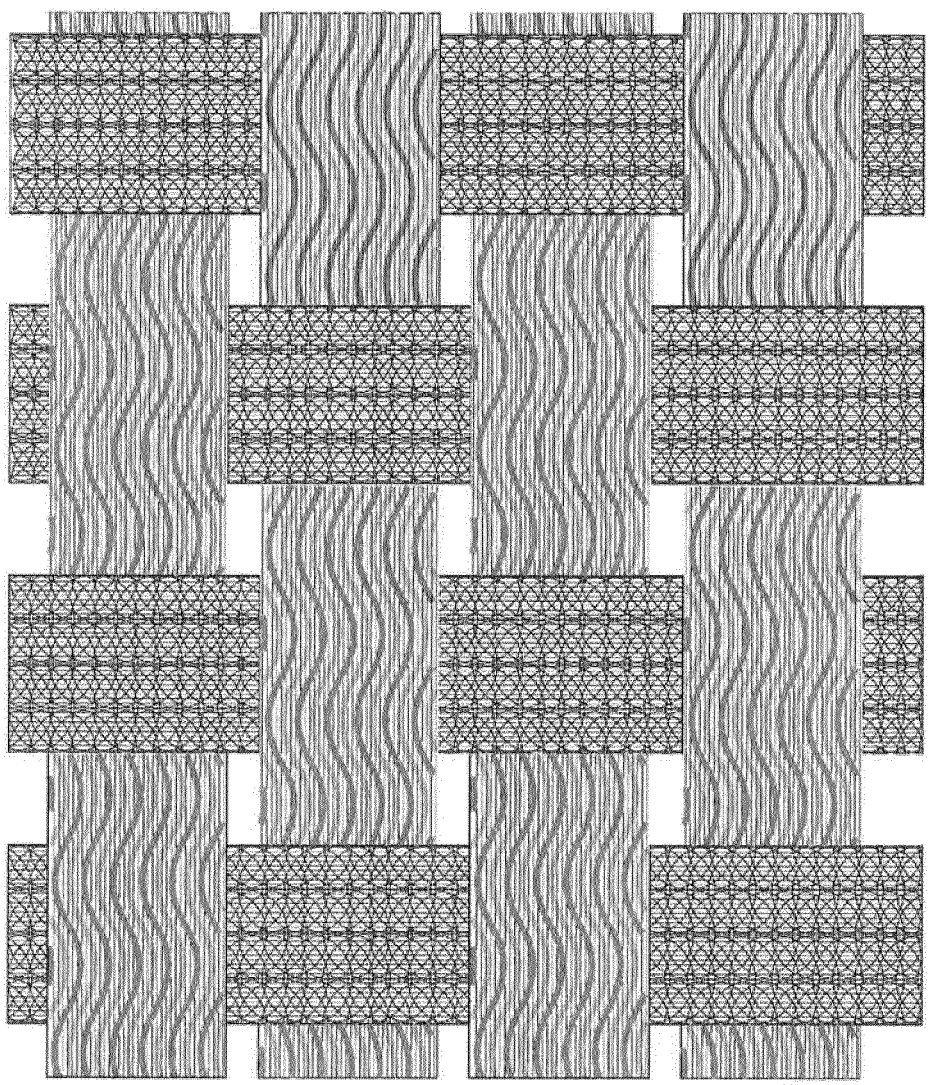
FIGS. 2a and 2b exemplify different types of woven pre-preg sheets; the former exemplifies the ultra-thin pre-preg tapes of different types occurring as warps and wefts in a woven material, and the latter exemplifies a woven material pre-preg comprising ultra-thin spread fibre tapes.

In FIG. 2a is exemplified a woven material produced using the ultra-thin pre-preg tapes of this invention. For illustration purpose, the ultra-thin pre-preg tapes, as the warps and wefts, are shown to be of different constructs for ease of distinguishing them. In actual practice the warps and wefts could be same type of ultra-thin pre-preg tapes. In the illustrated example, the resin occurs as whirling/coiling strand in the warp tapes, and as non-linear/curving strand-like in the weft tapes. The shown woven fabric is of open structure configuration. It may be also produced in close structure configuration. Such a woven ultra-thin pre-preg tape results in a correspondingly thin woven pre-preg. It may be warmed up, either entirely or in select places, for temporarily adhering the warp-weft tapes to each other for handling convenience, if necessary. Such a woven pre-preg can be used directly, either individually or by plying/stacking two or more of them in accordance with the end-use requirements. Further, such a woven pre-preg can be cut into pieces of required shape and dimensions and draped and plied in mutually different orientations to obtain improved multiaxial load-bearing capability and capacity of the final composite material. Further, such a woven pre-preg may be combined with any other suitable kind of ultra-thin pre-pregs to achieve the required performance characteristics of the final composite material.

Figure 2B:
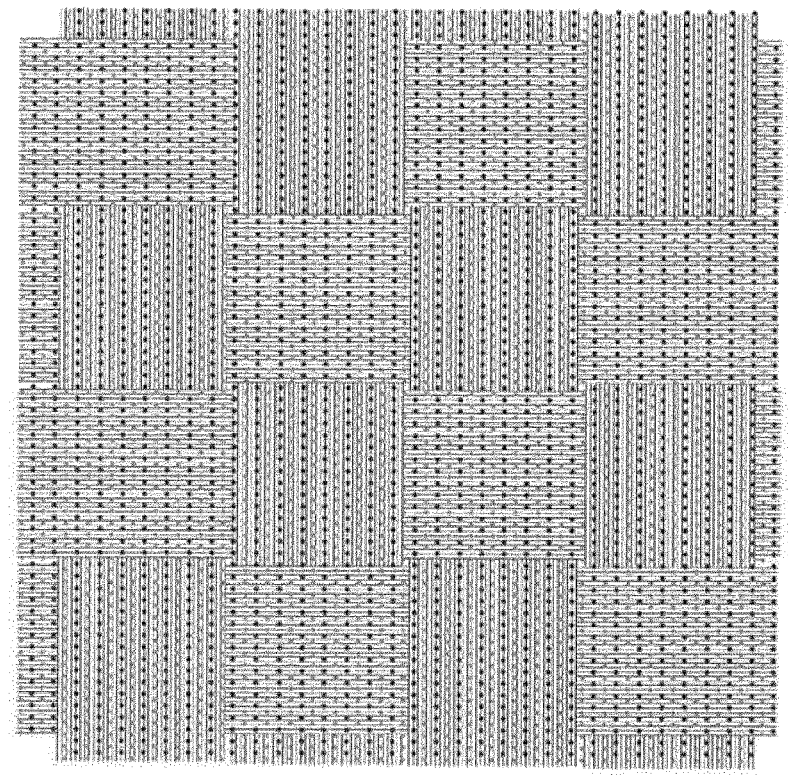
Figure 2B:
Figure 2B:
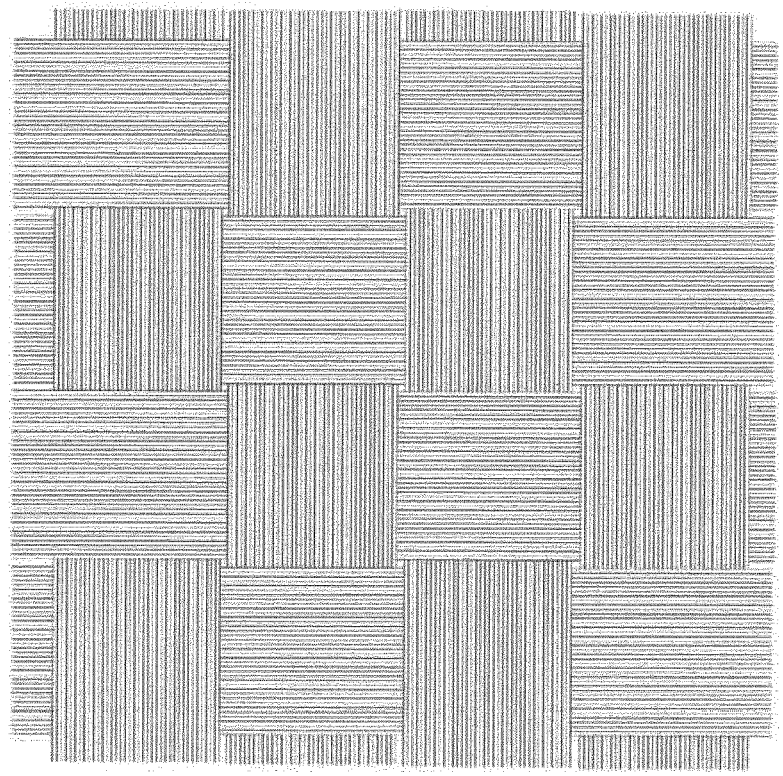

In FIG. 2b is exemplified conversion of a tape-woven fabric, composed of ultra-thin tapes, into a woven pre-preg by applying the resin in a patterned manner on its one or both surfaces using suitable standard equipment. In the illustration, the resin is shown to be applied in the form of well-distributed dots/speckles on both its surfaces. The produced woven ultra-thin pre-preg may be warmed up, either entirely or in select places, for temporarily adhering the warp-weft tapes to each other for handling convenience, if necessary. Such a woven pre-preg can be used directly, either individually or by plying/stacking two or more of them in accordance with the end-use requirements. Further, such woven pre-preg can be cut into pieces of required shape and dimensions, draped, and plied in mutually different orientations to obtain improved multiaxial load-bearing capability and capacity of the final composite material. Further, such a tape-woven pre-preg can be combined with any other suitable kind of pre-preg to achieve the required performance characteristics of the final composite material.

Narrow ultra-thin pre-preg tapes, for example up to 100 mm wide, could be also used directly to produce bi-directional bias orientation fabrics wherein the continuous-length tapes occur in acute/obtuse angles relative to the longitudinal direction of the fabric. Such bias fabrics can be produced in either close or open structural configurations to meet with the end-use requirements. Production of bi-directional bias fabrics using tapes is known from e.g. EP 2 479 327. It may be noted that such a bias fabric, called OFT, is technically neither woven nor braided as explained in detail therein, though generally incorrectly called by the said conventional names.

Figure 3A:
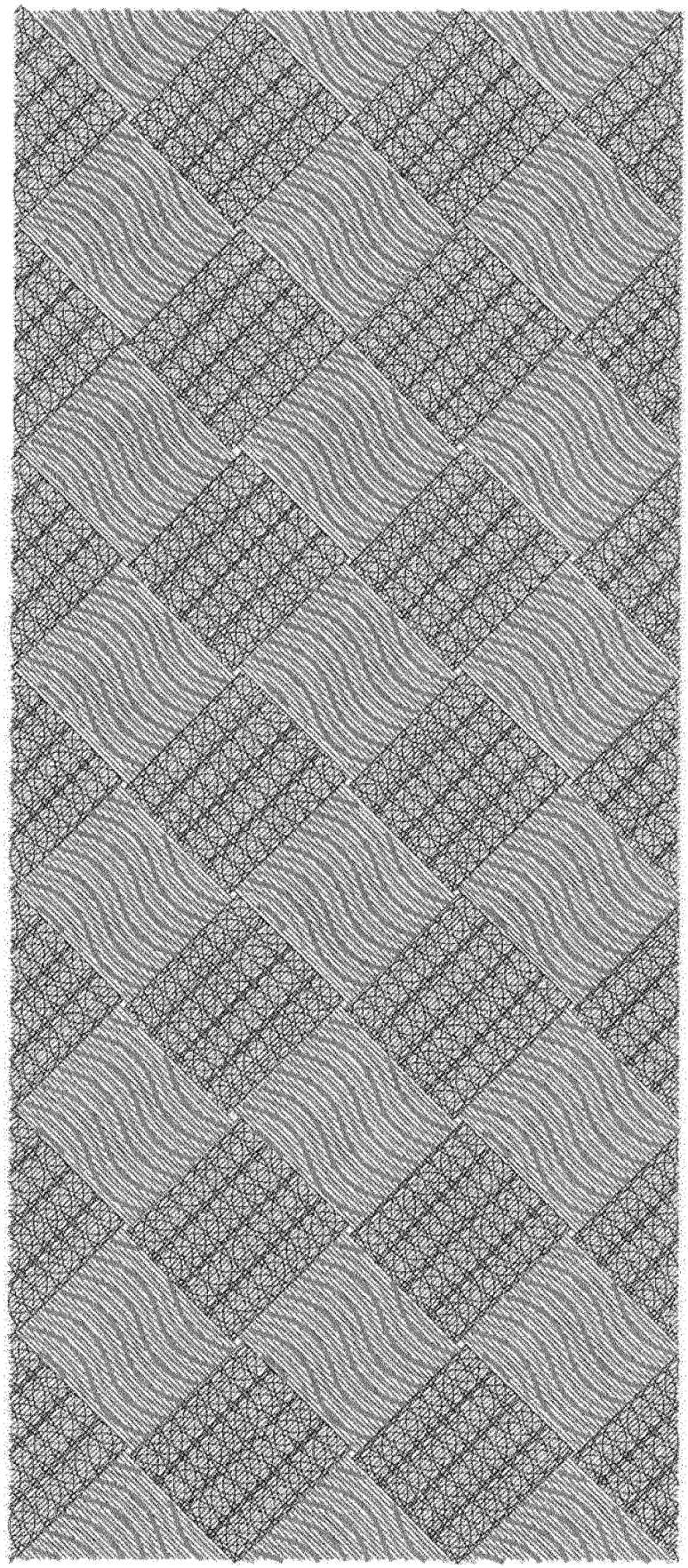
FIGS. 3a and 3b exemplify different types of bias pre-preg sheets; the former exemplifies the ultra-thin pre-preg tapes of different types occurring in mutually angular orientations in a bias material, and the latter exemplifies a bias material pre-preg comprising ultra-thin spread fibre tapes.

In FIG. 3a is exemplified a bi-directional bias oriented pre-preg produced using ultra-thin pre-preg tapes. For illustration purpose, different constructs of ultra-thin pre-preg tapes are shown in the two different bias orientations for ease of distinguishing them. In actual practice these bias tapes could be same type of ultra-thin pre-preg tapes. The resin occurs as whirling/coiling strand-like form on the tapes of one of the bias orientations, i.e. in the +45° orientation, and as non-linear/curving stripe-like form on the tapes of the other bias orientation, i.e. in the −45° orientation. The shown bi-directional bias fabric is of close structure configuration. It may be also produced in open structure configuration. Such a bias pre-preg is ultra-thin. It may be warmed up, either entirely or in select places, for temporarily adhering the bias-oriented tapes to each other for handling convenience, if necessary. Such bias ultra-thin pre-pregs can be used directly, either individually or by plying/stacking two or more of them in accordance with the end-use requirements. Further, such a bias ultra-thin pre-preg can be cut into pieces of required shape and dimensions and draped and plied in mutually different orientations to obtain improved multiaxial load-bearing capability and capacity of the final composite material. Further, such a bias ultra-thin pre-preg may be combined with any other suitable kind of ultra-thin pre-preg to achieve the required performance characteristics of the final composite material.

Figure 3B:
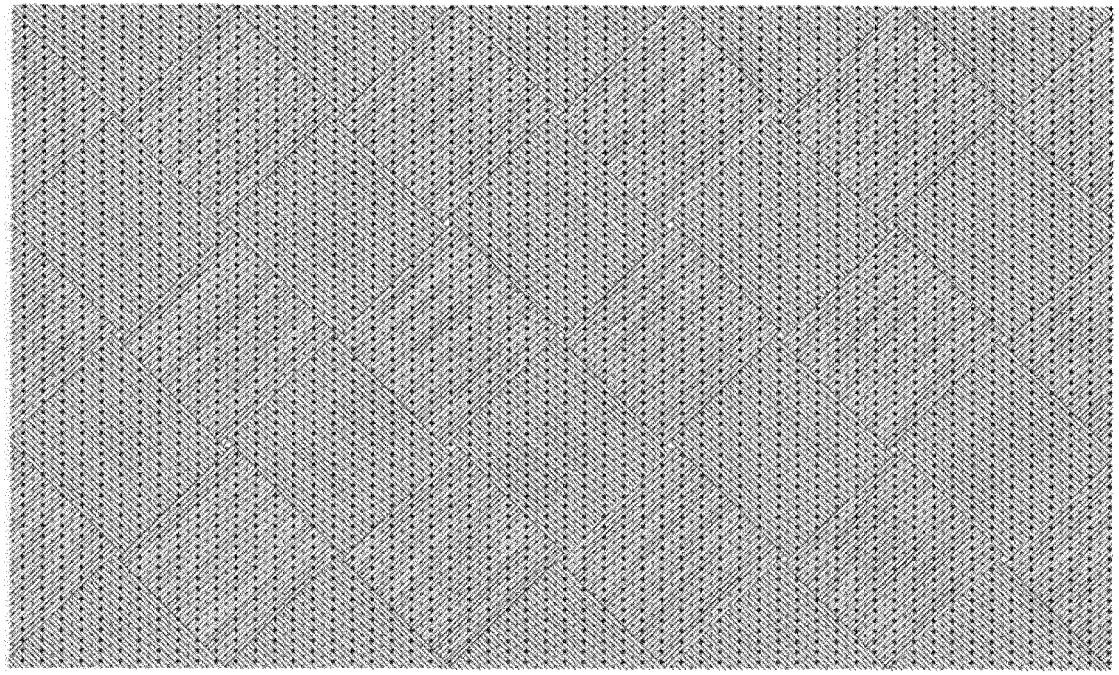
Figure 3B:
Figure 3B:
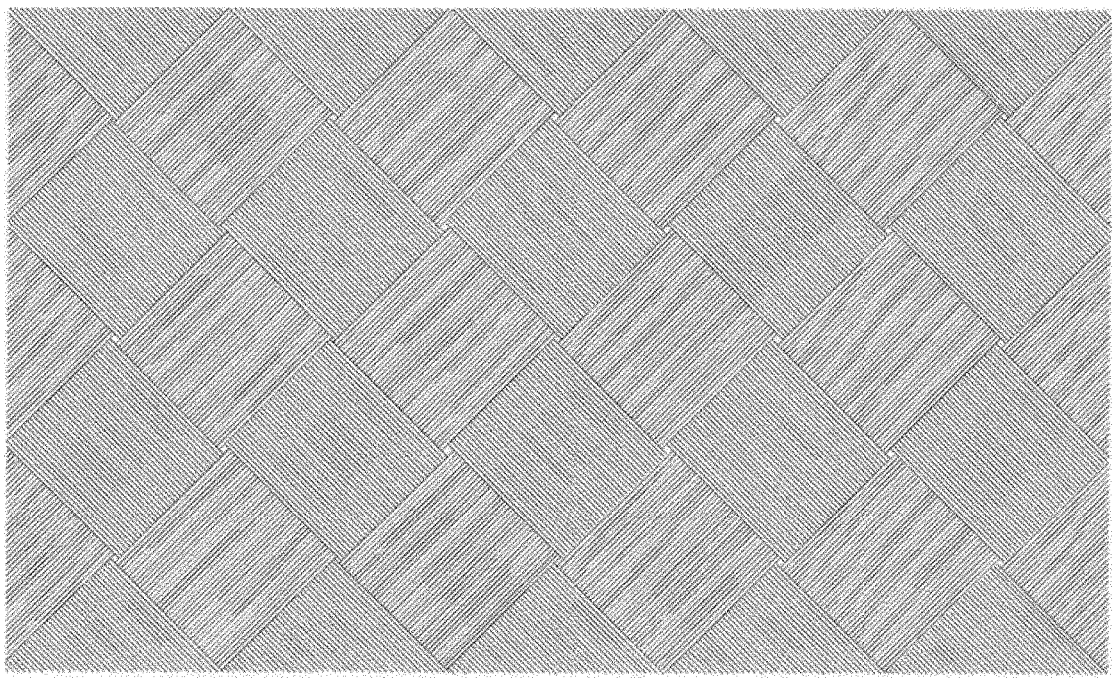

In FIG. 3b is exemplified conversion of a bi-directional bias fabric composed of ultra-thin tapes into an ultra-thin pre-preg sheet. Such a bias fabric is ultra-thin and converted into a pre-preg sheet by partly applying the resin in a patterned manner on its one or both surfaces using conventional equipment. In the illustration, the resin is indicated to be applied in the form of well-distributed dots/speckles on both the surfaces by methods well known and practiced in the industry, for example in the textile printing industry. It may be warmed up, either entirely or in select places, for temporarily adhering the bias tapes to each other for handling convenience, if necessary. Such a bias ultra-thin pre-preg sheet can be used directly, either individually or by plying/stacking two or more of them in accordance with the end-use requirements. Further, such bias ultra-thin pre-preg sheet can be cut into pieces of required shape and dimensions and draped and plied in mutually different orientations to obtain improved multiaxial load-bearing capability and capacity of the final composite material. Further, such a bias ultra-thin pre-preg sheet can be combined with any other suitable kind of ultra-thin pre-preg to achieve the required performance characteristics of the final composite material.

Figure 4A:
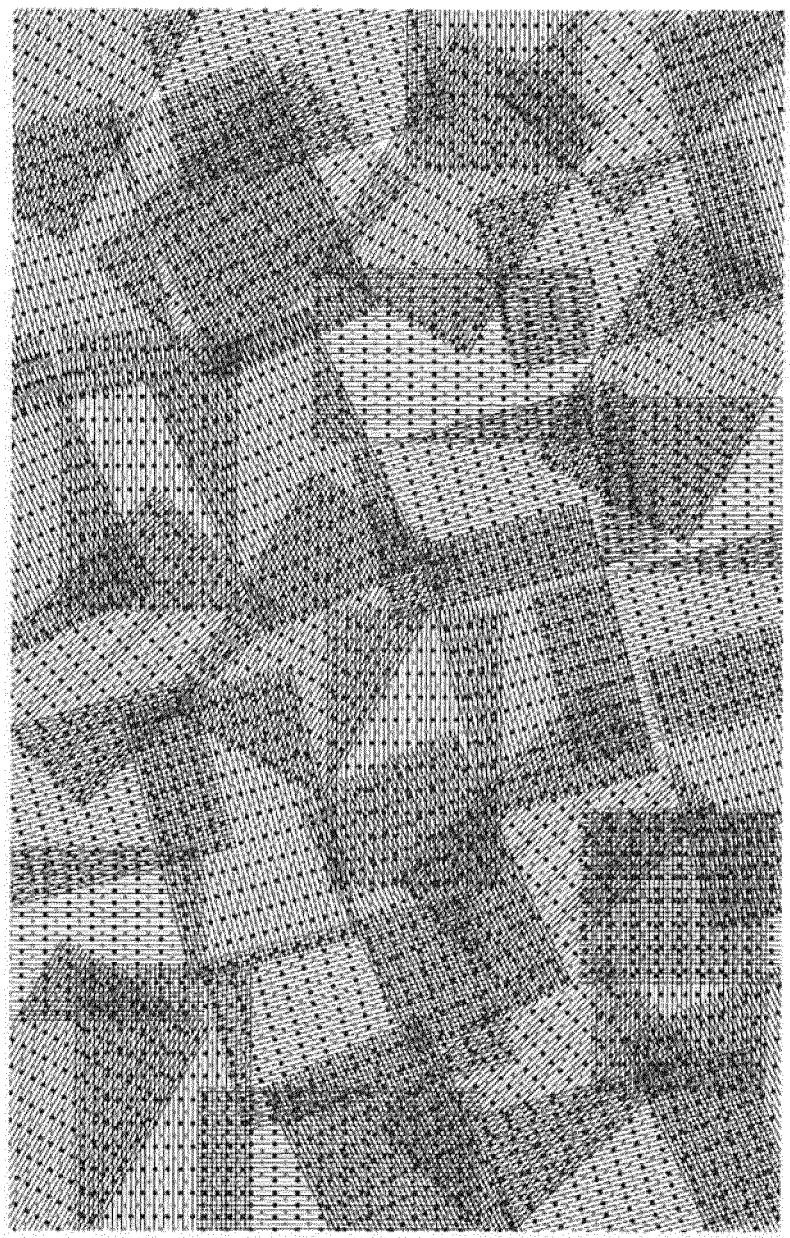
FIG. 4a exemplifies an organo reinforcement material comprising differently chopped pieces of ultra-thin pre-preg tapes occurring in random orientations.

In FIG. 4a is exemplified ultra-thin organo type pre-preg sheets composed of same-shaped chopped pieces of ultra-thin pre-preg tapes. The same-shaped chopped pieces of ultra-thin tapes are, for example dropped from a swinging feeder for scattering on an intermittently running and vibrating belt to achieve their random orientations. The deposited randomly oriented chopped pieces are arranged in a way that preferably most of them at least occur partly overlapped covering the area of required product's dimensions. Preferably, they occur uniformly distributed for realising substantially even thickness, i.e. not too many pieces stacking each other in one region than the other. The produced arrangement of chopped pieces is preferably warmed up under some pressure for temporarily adhering them to each other, if required, to enable the created assembly's handling. Following the said steps through aid of suitable implements known in the industry, the pre-preg sheet of this invention is obtained in either individual sheet form of suitable dimensions and shapes, or as continuous sheet in a roll form. Alternatively, different-shaped, different-dimensioned chopped pieces of ultra-thin pre-preg tapes may be used and scattered in random orientations and a pre-preg sheet obtained as just described.

Figure 4B:
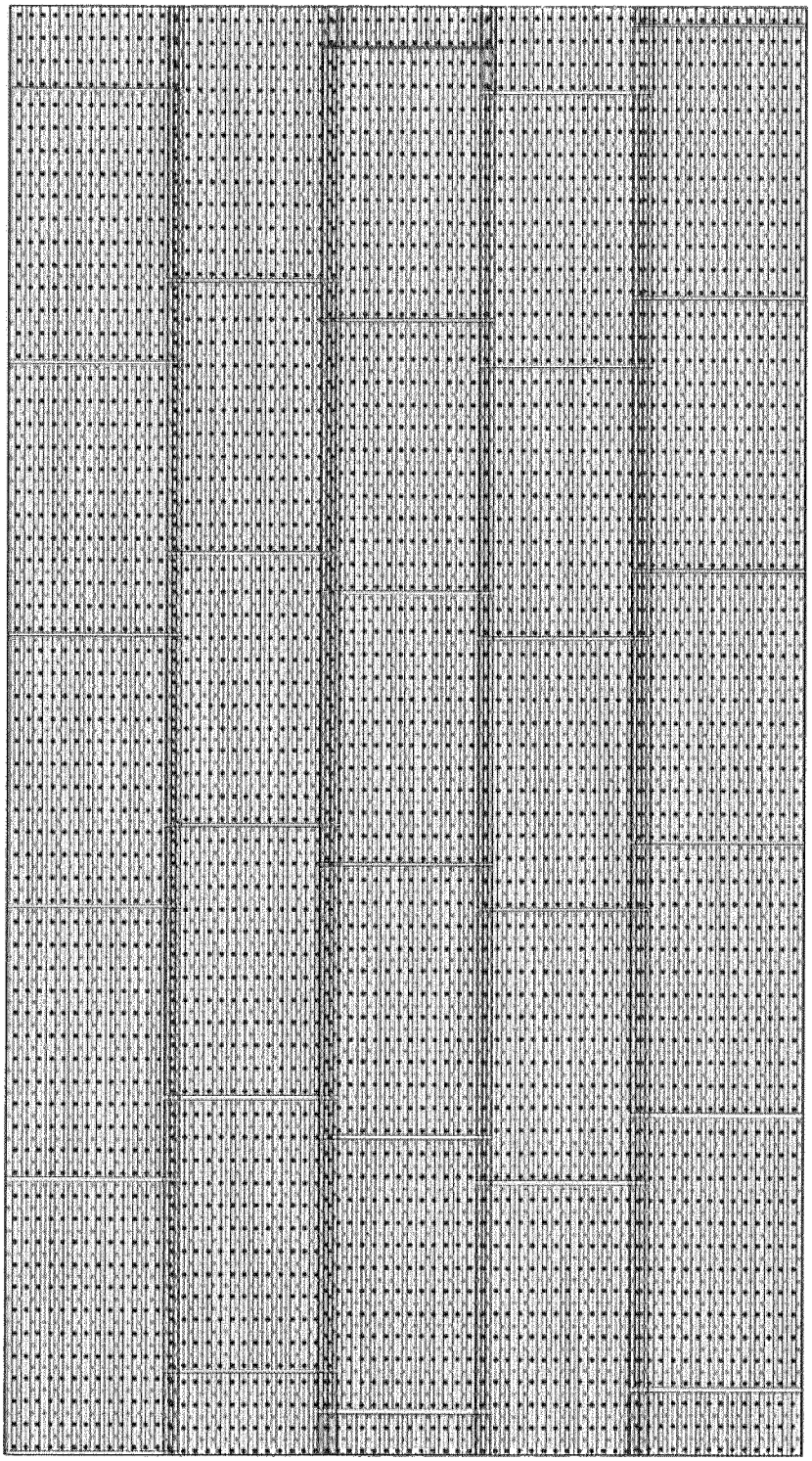
FIG. 4b exemplifies chopped pieces of the same shapes arranged in brick lay-up arrangement.

Alternatively, both different-shaped and same-shaped chopped pieces may be used in combination and oriented randomly for obtaining a corresponding pre-preg sheet on the lines just described. Alternatively, chopped pieces of same shapes with either different or same dimensions can be arranged in an ordered manner forming a sheet, for example in the brick lay-up arrangement shown in FIG. 4b. To produce with chopped tapes, a required number of partially overlapping pre-preg tapes are supplied in parallel and cut individually at relatively different positions and closely laid on a running belt which then continuously transfers the cut pieces on a reciprocating working bed to form one layer over the other. Plying/stacking a required number of such layers results in the desired ultra-thin pre-preg sheet. When laying such layers of chopped pieces, it is preferable that the chopped pieces in individual layers occur oriented in different directions relative to chopped pieces in the other layer/s. This is achieved, e.g. by altering the relative feeding direction between the working bed and the running belt for build of each layer.

In case an application requires that all the chopped pieces remain oriented in the same one direction, then it is preferable that the different layers are mutually offset so that the overlapping parts of chopped tapes in different layers do not lie coincident with each other. Alternatively, individual layers can be composed using chopped pieces of ultra-thin pre-preg tapes of relatively suitable different dimensions to prevent build-up of coincident overlapping parts of chopped tapes between the layers.

Yet another construct of pre-preg sheet can be produced by using different-shaped and same-shaped pieces of chopped ultra-thin pre-preg tapes. For example, in individual layers wherein both different-shaped and same-shaped chopped pieces occur in partly overlapping ordered orientation. Alternatively, same-shaped pieces occur in partly overlapping ordered orientation in one layer and different-shaped pieces occur likewise in another layer. Each of such arrangements of chopped pieces of ultra-thin pre-preg tapes is preferably warmed up for temporarily adhering them to each other forming the pre-preg layer. A number of such layers are plied/stacked to obtain the desired ultra-thin pre-preg sheet.

Such an ultra-thin pre-preg sheet can be used directly, either individually or further plied/stacked in accordance with the end-use requirements. Such an ultra-thin pre-preg sheet is highly flexible and drape-able. This type of ultra-thin pre-preg sheet can be combined with any other suitable kind of pre-preg sheet, for example to achieve the required performance characteristics of the final composite material. An important advantage of such a material is that virtually no waste is generated as chopped/cut ultra-thin pre-preg tapes can be fully well utilised.

While the foregoing examples illustrate some constructs of ultra-thin unidirectional pre-preg sheets and bi-directional pre-preg sheets (i.e. woven and bias types), it is to be understood that other types, for example different types of multi-directional pre-preg sheets, can be also produced. For example, the exemplified woven and bias ultra-thin pre-preg sheets can be mutually plied/stacked in suitable orientations, as is practiced conventionally, to obtain a corresponding ultra-thin multi-directional pre-preg sheet. Alternatively, uni-directional ultra-thin pre-preg sheets can be combined with either woven ultra-thin pre-preg sheets, or bias ultra-thin pre-preg sheets, or their combinations, to obtain other types of multi-directional ultra-thin pre-preg sheets.

The obtained ultra-thin pre-preg sheet can be used directly in the manufacture of composite materials. As mentioned earlier, the novel ultra-thin pre-pregs can be cut into patterned pieces of required shapes and dimensions, draped, and plied/stacked in suitable orientations to achieve required performance and shape of the desired composite material product. Depending on the size and shape of the object required to be produced, the necessary number of cut patterned pieces of ultra-thin pre-preg sheets can be directly draped on a mould, which could be of either close or open types. The sheets of such ultra-thin pre-pregs can be locally warmed/heated, i.e. wherever needed, during plying/stacking procedure to enable them to temporarily stick/hold on to each other in the required form.

After the draping procedure is completed, the mould, if of close type, is closed and heated for required duration. As is known, the closing mould presses on the stacked sheets and applies the necessary pressure uniformly. Alternatively, if the shaped ultra-thin pre-preg is created on an open mould, it can be put in an autoclave and heated following the known procedures, whereby high air pressure and heat gets applied on the stack of sheets resting on the open mould. These and other conventional methods, for example wherein pressure is applied using a heated roller on pre-pregs draped on an open mould, are well-known in the field and require no further description. As can be noticed, existing equipment and practices of composite material manufacture can be advantageously used with ultra-thin pre-preg sheets to produce improved composite materials.

Upon cooling, the composite material product is extracted from the mould in the usual way. As can be understood, the ultra-thin pre-pregs of this invention enable quick and tidy production.

The inventions have been described in reference to specific embodiments of the ultra-thin pre-preg tapes and sheets, its manufacture, and the manufacture of composite material products reinforced by ultra-thin pre-pregs. To persons skilled in the art there will be motivation now to consider several possibilities. For example, those relating to alteration of fibre types, their constructs, compositions, dimensions, orientation arrangements etc. Further, the resin may be applied in different styles/forms other than those illustrated/exemplified. Further, the order of manufacturing certain steps may be performed differently, for example stepwise or simultaneously, or the manufacturing steps of ultra-thin pre-pregs and its composite material may be combined in different ways etc. Further, the possibility of producing an ultra-thin pre-preg using a fine thermoplastic net or veil for matrix material will be also obvious.

The possibility of using ultra-thin pre-pregs for strengthening buildings, heritage monuments, bridges etc. by applying them on such structures and heating them under pressure, and achieving their adhesion to the structure, is technically akin to draping it on a mould and heating it under pressure to form a composite material product. Such use and application of the ultra-thin pre-pregs and bonding it by other suitable adhesives to the building structures, is not excluded from the scope of the disclosed inventions.

In the claims that follow, any reference to signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A pre-preg sheet comprising a fibre reinforcement and either a thermoset or thermoplastic matrix material, wherein the fibre reinforcement comprises unidirectional spread fibres and the pre-preg sheet has a thickness of 20-40 micrometers, a volume fraction of fibres of at least 40% and a fibre areal weight of 15-50 g/m$^2$, wherein the thermoset or thermoplastic matrix material is provided in the form of a layer attached to at least one surface of the fibre reinforcement and in a pattern to expose the unidirectional spread fibres, said layer being provided with pores or openings for exposing fibres of the reinforcement through said layer, wherein a weight of the matrix material is within the range of 5-50% of the total weight of the pre-preg sheet and wherein the patterned matrix material is arranged to spread, coalesce, engulf and embed the fibres of the fibre reinforcement on application of heat and pressure and form a layer having a thickness in the range of 2 to 4 micrometer on at least one surface of the pre-preg sheet, the layer of matrix material with the said thickness configured to function as a slip plane to enable mutual slipping of the fibres in plied sheets and at the same time resisting splitting of the resin and suppressing development of micro-cracks.

2. The pre-preg sheet of claim 1, wherein the pre-preg sheet is in the form of a tape, having a length exceeding 5 mm and a width exceeding 2 mm.

3. The pre-preg sheet of claim 1, wherein the crimp angle of its fibres is less than 3 degrees.

4. The pre-preg sheet of claim 1, wherein a volume-fraction of fibres within the pre-preg sheet is equal to or less than 90%.

5. The pre-preg sheet of claim 1, wherein the fibres comprises carbon fibres.

6. The pre-preg sheet of claim 1, wherein the matrix material is a thermoset matrix material, and wherein the thermoset matrix material is in solid-state below a first temperature, and soft and tacky above said temperature, and wherein the matrix material is irreversibly cured when heated above a second temperature for a certain duration of time, wherein the first temperature is 20 degrees C. or more, and wherein the second temperature is higher than said first temperature.

7. The pre-preg sheet of claim 1, wherein the matrix material in said layer is provided in the form of continuous or discontinuous lines, extending at least partly in a direction different from the direction of the fibres.

8. The pre-preg sheet of claim 1, wherein the matrix material in said layer is provided in the form of disconnected dots or speckles.

9. A multi-ply arrangement comprising at least two pre-preg sheets in accordance with claim 1, wherein the pre-preg sheets are arranged at least partly overlapping each other, and wherein the overlapping pre-preg sheets have their fibres oriented in mutually different directions.

10. The multi-ply arrangement of claim 9, wherein at least some of the pre-preg sheets are tapes extending over the entire width and/or length of the multi-ply arrangement.

11. The multi-ply arrangement of claim 10, wherein at least some of the pre-preg sheets are short tapes, having a length of 5-80 mm and a width of 2-30 mm.

12. Use of a pre-preg sheet according to claim 1 for the manufacture of a composite material.

13. The use of claim 12, comprising application of heat and pressure to the applied patterned thermoset or thermoplastic matrix material to spread, coalesce, engulf and embed the fibres to form the composite material.

14. A pre-preg sheet comprising a fibre reinforcement and either a thermoset or thermoplastic matrix material, wherein the fibre reinforcement comprises unidirectional spread fibres and the pre-preg sheet has a thickness of 20-40 micrometers, a volume fraction of fibres of at least 40% and a fibre areal weight of 15-50 g/m$^2$, wherein the matrix material is formed as a layer attached to at least one surface of the fibre reinforcement and provided in the form of either continuous or discontinuous lines, extending at least partly in a direction different from the direction of the fibres, or in the form of disconnected dots or speckles, the pre-preg displaying resin impregnated fibres in some parts and dry fibres with a plurality of micropores, openings or interstices between them in other parts, wherein a weight of the matrix material is within the range of 5-50% of the total weight of the pre-preg sheet and wherein the matrix material is arranged to spread, coalesce, engulf and embed the fibres of the fibre reinforcement on application of heat and pressure and form a layer having a thickness in the range of 2 to 4 micrometer on at least one surface of the pre-preg sheet, the layer of matrix material with the said thickness configured to function as a slip plane to enable mutual slipping of the fibres in plied sheets and at the same time resisting splitting of the resin and suppressing development of micro-cracks.

15. The pre-preg sheet of claim 1, wherein the fibres comprise ultra high modulus carbon fibres (UHMCF).

16. The pre-preg sheet of claim 1, wherein a majority of the fibres of the fibre reinforcement are exposed at the surfaces.

17. The pre-preg sheet of claim 14, wherein a majority of the fibres of the fibre reinforcement are exposed at the surfaces.

18. A multi-ply arrangement comprising at least two pre-preg sheets, each of the pre-preg sheets comprising a fibre reinforcement and either a thermoset or thermoplastic matrix material, wherein the fibre reinforcement comprises unidirectional spread fibres and the pre-preg sheet has a thickness of 20-40 micrometers, a volume fraction of fibres of at least 40% and a fibre areal weight of 15-50 g/m², wherein the thermoset or thermoplastic matrix material is provided in the form of a layer attached to at least one surface of the fibre reinforcement and in a pattern to expose the unidirectional spread fibres, said layer being provided with pores or openings for exposing fibres of the reinforcement through said layer, wherein a weight of the matrix material is within the range of 5-50% of the total weight of the pre-preg sheet and wherein the patterned matrix material is arranged to spread, coalesce, engulf and embed the fibres of the fibre reinforcement on application of heat and pressure and form a layer having a thickness in the range of 2 to 4 micrometer on at least one surface of the pre-preq sheet, wherein the pre-preg sheets are arranged at least partly overlapping each other, wherein the overlapping pre-preg sheets have their fibres oriented in mutually different directions and wherein the thickness of the layer of matrix material between the two at least partly overlapping pre-preg sheets is in the range of 2 to 4 micrometer, the layer of matrix material with the said thickness configured to function as a slip plane to enable mutual slipping of the fibres in plied sheets and at the same time resisting splitting of the resin and suppressing development of micro-cracks.

\* \* \* \* \*